US012806950B2

(12) United States Patent
Nordhaus et al.

(10) Patent No.: US 12,806,950 B2
(45) Date of Patent: Nov. 24, 2026

(54) TUNABLE MASS DAMPER

(71) Applicant: AirBoss Flexible Products, LLC, Auburn Hills, MI (US)

(72) Inventors: Mark J. Nordhaus, Farmington, MI (US); Jeffrey D. Auten, West Bloomfield, MI (US)

(73) Assignee: AirBoss Flexible Products, LLC, Auburn Hills, MI (US)

( * ) Notice: Subject to any disclaimer, the term of this patent is extended or adjusted under 35 U.S.C. 154(b) by 243 days.

(21) Appl. No.: 18/919,635

(22) Filed: Oct. 18, 2024

(65) Prior Publication Data

US 2026/0109189 A1 Apr. 23, 2026

(51) Int. Cl.

| | |
|---|---|
| ***B60G 13/16*** | (2006.01) |
| ***F16F 1/36*** | (2006.01) |
| ***F16F 1/371*** | (2006.01) |
| ***F16F 15/22*** | (2006.01) |

(52) U.S. Cl.

CPC ............ *B60G 13/16* (2013.01); *F16F 1/3615* (2013.01); *F16F 1/371* (2013.01); *F16F 1/3713* (2013.01); *F16F 15/22* (2013.01); *B60G 2202/25* (2013.01); *F16F 2230/0058* (2013.01)

(58) Field of Classification Search

CPC ........ F16F 1/3615; F16F 1/371; F16F 1/3713; F16F 15/22; F16F 15/28; F16F 2230/0058; B60G 13/16; B60G 2202/25

USPC .......................................................... 188/379

See application file for complete search history.

(56) References Cited

U.S. PATENT DOCUMENTS 2,636,399 A 4/1953 O'Connor
3,990,324 A * 11/1976 Fishbaugh .......... F16F 15/1442 29/451
4,207,957 A * 6/1980 Sivers ................. F16F 15/1442 464/180
4,889,328 A * 12/1989 Uno ........................ F16F 13/22 267/293
6,216,833 B1 * 4/2001 Lefferts ................... F16F 7/108 188/380
6,682,060 B2 * 1/2004 Kato ....................... F16F 15/10 267/141
6,725,985 B2 * 4/2004 Haneishi ............. F16F 15/1442 188/379
6,736,246 B2 * 5/2004 Haneishi ............. F16F 15/1428 188/379
7,140,603 B2 * 11/2006 Maeno ................. B60K 5/1208 267/140.13

(Continued)

FOREIGN PATENT DOCUMENTS

EP 1338819 A2 * 8/2003 ............. F16F 15/10

*Primary Examiner* — Devon C Kramer

(74) *Attorney, Agent, or Firm* — WARNER NORCROSS + JUDD LLP

(57) ABSTRACT

A tunable mass damper is provided. The tunable mass damper includes a mounting bracket and a molded assembly, the molded assembly comprising an elastomeric coating that is overmolded onto a damper mass. The elastomeric coating includes one or more slots that are shaped to receive a corresponding elastomeric tab. Each elastomeric tab can be positioned within a corresponding slot on an as-needed basis to incrementally raise the natural frequency of the tunable mass damper. The molded assembly is then press-fit into the mounting bracket, thereby ensuring the tunable mass damper attenuates engine vibrations at a target frequency.

20 Claims, 5 Drawing Sheets

(56) References Cited

U.S. PATENT DOCUMENTS

| | | | | |
|---|---|---|---|---|
| 7,987,954 | B2 * | 8/2011 | McPherson | F16F 7/108 267/136 |
| 8,136,646 | B2 * | 3/2012 | Kuwayama | F16F 7/108 267/141 |
| 8,800,736 | B2 | 8/2014 | Kashani | |
| 9,909,644 | B2 | 3/2018 | Cegar et al. | |
| 10,228,037 | B2 | 3/2019 | Kim | |
| 10,933,727 | B2 | 3/2021 | Kim et al. | |
| 12,534,002 | B2 * | 1/2026 | Baumert | B60N 2/503 |
| 2003/0159899 | A1 * | 8/2003 | Haneishi | F16F 15/10 188/379 |
| 2003/0222386 | A1 | 12/2003 | Duerre et al. | |
| 2005/0133325 | A1 * | 6/2005 | Kuwayama | F16F 7/108 188/379 |
| 2007/0144852 | A1 * | 6/2007 | Furuya | F16F 7/108 188/379 |
| 2008/0205809 | A1 | 8/2008 | Lin et al. | |
| 2011/0049776 | A1 * | 3/2011 | Gustavsson | F16F 7/108 267/140.11 |
| 2015/0337916 | A1 * | 11/2015 | Cerri | F16F 7/108 188/379 |
| 2019/0072151 | A1 * | 3/2019 | Kim | F16F 13/10 |
| 2019/0366825 | A1 | 12/2019 | Kim | |
| 2020/0001695 | A1 * | 1/2020 | Kim | F16F 13/1427 |
| 2020/0055384 | A1 * | 2/2020 | Kim | B60K 5/1283 |
| 2020/0376912 | A1 | 12/2020 | Werner et al. | |

* cited by examiner

TUNABLE MASS DAMPER

FIELD OF THE INVENTION

The present invention relates to tunable mass dampers for reducing vibrations within a vehicle, optionally for engine mounts and vehicle suspensions.

BACKGROUND OF THE INVENTION

Mass dampers are used to attenuate vibrations from an automobile engine or an automobile suspension, which would otherwise cause unwanted vibration in the vehicle body. When the engine or the suspension produces vibrations at a certain frequency, the mass damper oscillates in a way that counteracts these vibrations, effectively reducing their amplitude. Mass dampers can be tuned to specific frequencies that are the most problematic. For example, if an engine produces strong vibrations at a particular engine RPM, a mass damper can be tuned to counteract those frequencies, providing smoother operation at the engine RPM.

Mass dampers typically include a mounting bracket, a damper mass, and a spring element. The mounting bracket transmits vibrations to and from the vehicle and ensures that the damper mass remains in place even during high vibrations, acceleration, and deceleration. The damping mass oscillates in response to system vibrations, generally absorbing some or all of the vibrational energy. Lastly, the spring element can be formed from an elastomeric material and physically isolates the damper mass from the mounting bracket. The elastomeric material simultaneously connects and separates the damper mass and the mounting bracket, reducing rattling and unwanted noise, while also providing an extra layer of dampening by absorbing and dissipating vibrational energy.

In some instances, manufacturing tolerances can result in a mass damper having a natural (or resonant) frequency that is above or below a target frequency range. If the natural frequency is outside of the target frequency range, the mass damper will not oscillate properly in response to vibrations within the target frequency range, leading to insufficient damping, greater stress on vehicle components, and increased noise in the vehicle cabin.

Accordingly, there remains a continued need for an improved mass damper. In particular, there remains a continued need for an improved mass damper that can be tuned to a specific target frequency or frequency range for engine mounts and other applications.

SUMMARY OF THE INVENTION

An improved tunable mass damper is provided. The tunable mass damper includes a mounting bracket and a molded assembly, the molded assembly comprising an elastomeric coating that is overmolded onto a damper mass or otherwise supports the mass with rubber. The elastomeric coating includes one or more recessed slots that are shaped to receive a corresponding elastomeric tab. Each elastomeric tab can be positioned within a slot on an as-needed basis to incrementally raise the natural frequency of the tunable mass damper. The molded assembly is then press-fit into the mounting bracket, thereby ensuring the tunable mass damper attenuates engine vibrations at a target frequency.

In one embodiment, the elastomeric tabs are integrally formed with the elastomeric coating, being joined to the elastomeric coating along a living hinge. If the natural frequency of the tunable mass damper is below a target frequency, the elastomeric tabs can be folded along the living hinge until flush with the outer surface of the elastomeric coating. In other embodiments, the elastomeric tabs are formed separately from the elastomeric coating, and the elastomeric tabs are manually placed into a slot in the elastomeric coating. Once the molded assembly is press-fit into the mounting bracket, the elastomeric tabs are radially compressed against the elastomeric coating. The elastomeric tabs increase the contact area between the elastomeric material and the mounting bracket, which increases the stiffness of the elastomeric coating, thereby increasing the natural frequency of the tunable mass damper.

In operation, each molded assembly is tested via a press test while held in a fixture to determine if the elastomeric coating is softer or harder than specified. Because elastomers can have a Shore A durometer that varies by +/−5 durometer or more, a softer elastomer can result in a natural frequency that is too low, while a harder elastomer can result in a natural frequency that is too high. The stiffness of the elastomeric coating is then used to determine whether the final assembly should include one or more of the elastomeric tabs. If the stiffness of the elastomeric coating is below a desired level, one or more of the elastomeric tabs are added to the molded assembly. The molded assembly is then pressed into the mounting bracket. The elastomeric coating prevents direct contact between the damper mass and the mounting bracket, and the elastomeric coating functions as a spring element between the damper mass and the mounting bracket. As a result, the natural frequency of the tunable mass damper can be varied on an as-needed basis to ensure specific vibrations are appropriately attenuated.

As discussed herein, the present invention includes a molded assembly that is designed to have a natural frequency just under a target frequency. One or more elastomeric tabs are added to the molded assembly on an as-needed basis to incrementally increase the natural frequency of the molded assembly until the natural frequency is equal to the target frequency. Once the elastomeric tabs are added to the molded assembly, a power press is used to press the molded assembly into the mounting bracket. As a result, the mass damper is manually tuned during final assembly to attenuate engine vibrations at the desired target frequency.

These and other features and advantages of the present invention will become apparent from the following description of an embodiment of the invention, when viewed in accordance with the accompanying drawings and appended claims.

DETAILED DESCRIPTION OF THE CURRENT EMBODIMENTS

Figure 1:
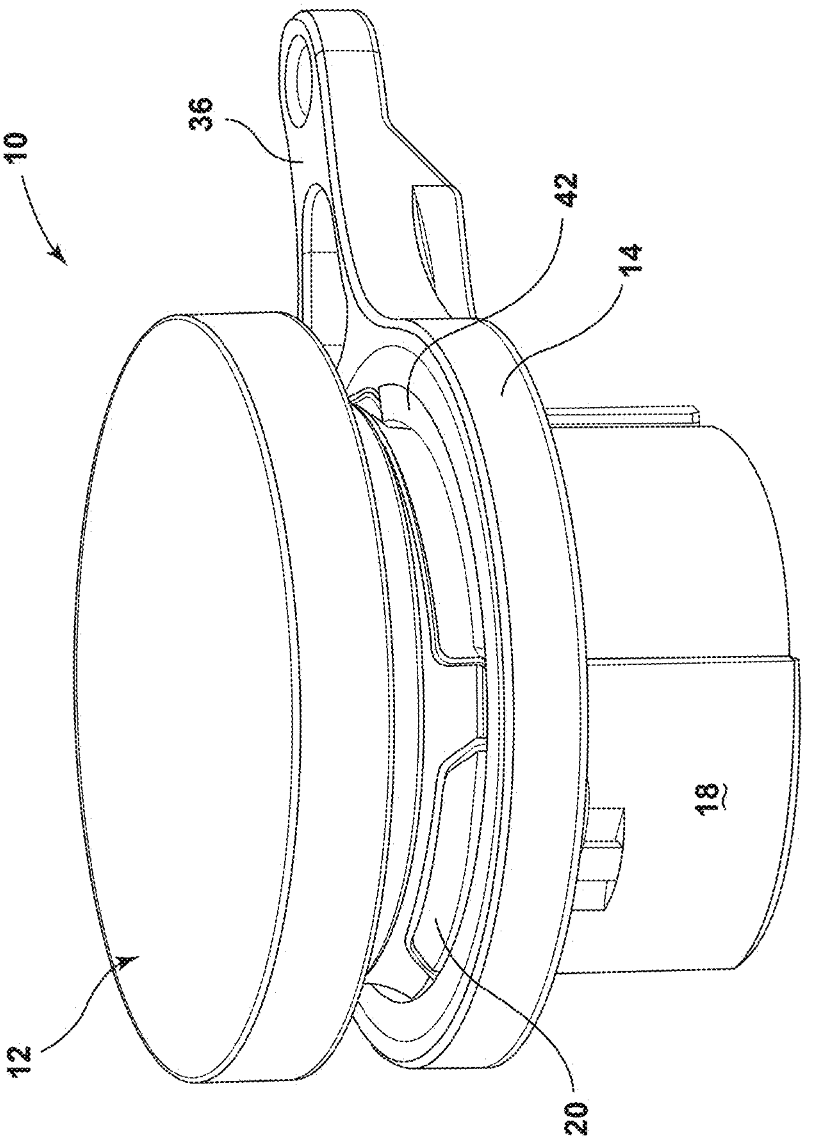
FIG. 1 is a perspective view of a tunable mass damper in accordance with one embodiment of the invention.
Figure 2:
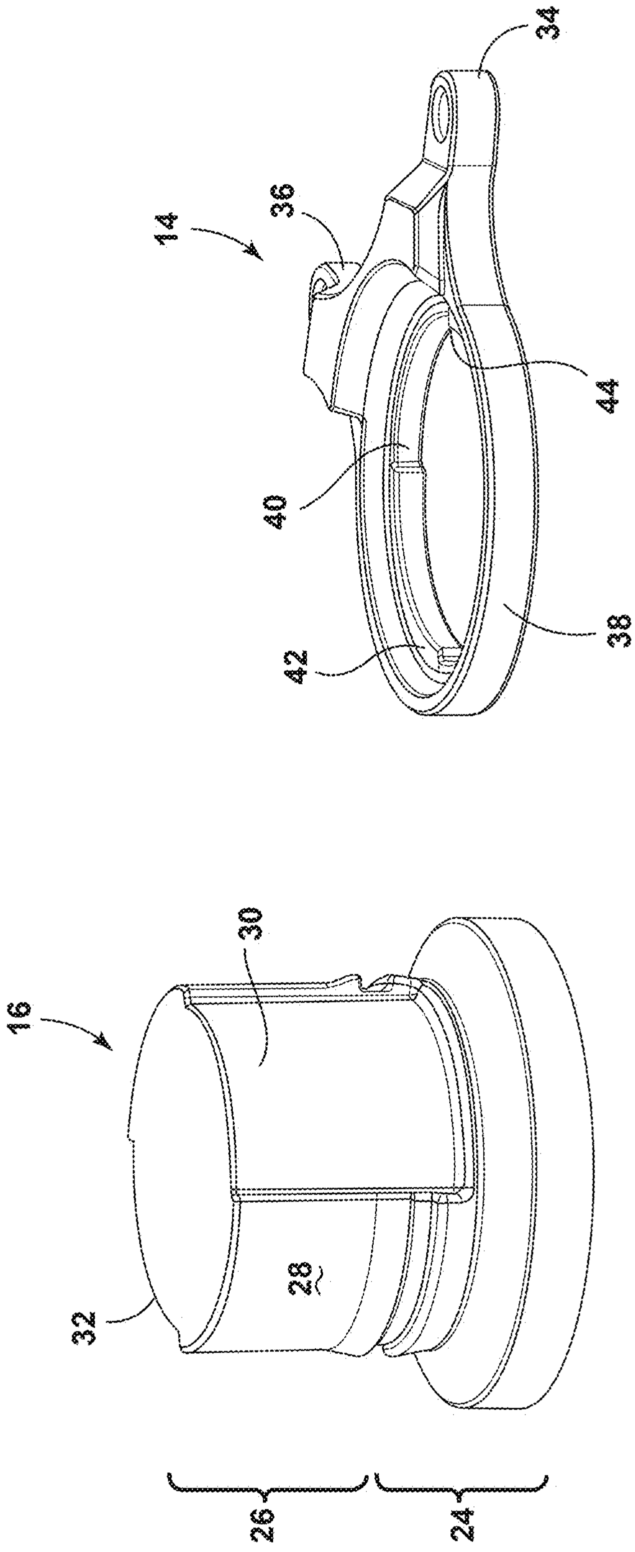
FIG. 2 is a perspective view of a damper mass and a mounting bracket for the tunable mass damper of FIG. 1.
Figure 3:
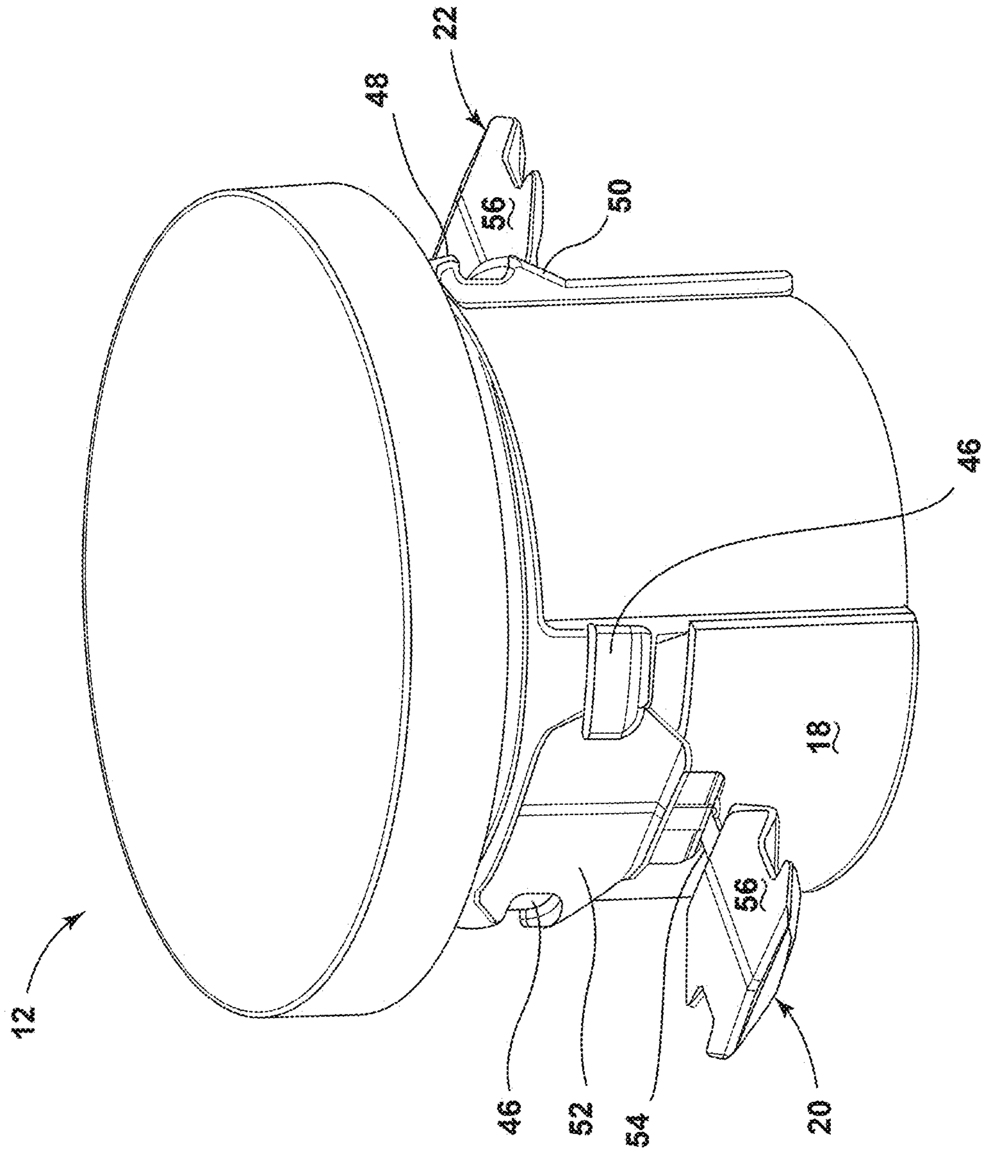
FIG. 3 is a perspective view of a molded assembly including elastomeric tabs for tuning the natural frequency of the mass damper.

Turning now to FIGS. 1-3, a tunable mass damper according to one embodiment is illustrated and designated 10. The tunable mass damper 10 includes a molded assembly 12 and a mounting bracket 14. The molded assembly 12 includes a variable geometry for changing the natural frequency of the tunable mass damper 10. More specifically, the molded assembly 12 comprises an internal damper mass 16 (visible in FIG. 2), an elastomeric coating 18, and one or more elastomeric tabs 20, 22. The elastomeric tabs 20, 22 can be positioned in recessed slots between the mounting bracket 14 and the elastomeric coating 18 to incrementally raise the natural frequency of the tunable mass damper 10 on an as-needed basis, thereby ensuring the tunable mass damper 10 attenuates vibrations at a specified frequency. Each such feature is discussed below.

The damper mass 16 is shown in the inverted position in FIG. 2 and is formed from a dense material, for example steel, cast iron, or tungsten, for counteracting engine vibrations. The damper mass 16 is generally cylindrical, having a head portion 24 and a body portion 26. The head portion 24 includes an outer diameter that is greater than the outer diameter of the body portion 26, such that the head portion 24 extends radially outward beyond the body portion 26. The elastomeric coating 18 (alternatively referred to as an elastomeric sleeve) is overmolded onto the damper mass 16 via an injection molding process, such that no portion of the damper mass 16 directly contacts the mounting bracket 14. The elastomeric material can be selected according to its hardness, optionally having a Shore A durometer of 50-70. In addition, the elastomeric material can have a thickness ranging from a few millimeters to several centimeters. The present invention is not limited to any one elastomeric material. Suitable elastomeric materials include, for example, natural rubber, nitrile rubber, polyurethane, or silicone rubber. As an alternative to injection molding, the elastomeric material can be applied by dip coating or spray coating a liquid elastomer to the damper mass 16, which can result in a thin, uniform elastomeric coating.

As also shown in FIG. 2, the damper mass 16 includes an outer circumferential surface 28 defining a first arcuate section 30 opposite of a second arcuate section 32. Each of the first and second arcuate sections 30, 32 comprise recessed portions of the outer circumferential surface 28. The recessed portions span approximately 90 degrees in the illustrated embodiment, while in other embodiments of the recessed portions span greater or less than 90 degrees. The damper mass 16 is not limited to the cylindrical geometry of FIG. 2 however. Other geometries include a cuboid construction in which the mounting bracket 14 is rectangular and the damper mass 16 comprises a cuboid. Still other geometries can be used in other embodiments, including pentagonal, hexagonal, and octagonal geometries, by non-limiting example.

The mounting bracket 14 is also illustrated in FIG. 2 and is generally shaped to axially receive the body portion 26 of the damper mass 16. The mounting bracket 14 is formed from a rigid material, for example steel, for transferring vibrational energy to the molded assembly 12. The mounting bracket 14 includes first and second mounting arms 34, 36 extending radially outward from a mounting collar 38. Each mounting arm 34, 36 includes a fastener through-hole for securing the mounting bracket 14 to a suitable engine mount (or other vehicle component). The mounting collar 38 is ring-shaped and includes an inner circumferential surface 40 that is keyed to match the outer circumferential surface of the molded assembly 12. In the illustrated embodiment, the mounting collar 38 includes first and second radial flanges 42, 44 for preventing rotational movement of the molded assembly 12 relative to the mounting bracket 14.

As noted above, the molded assembly 12 includes an elastomeric coating 18 that is overmolded onto the damper mass 16. As best shown in FIG. 3, the elastomeric coating 18 includes a segmented channel 46 extending circumferentially about the molded assembly 12. The segmented channel 46 is shaped to receive the mounting collar 38 and is bordered by a raised shelf 48 and a ramped shelf 50. When the molded assembly 12 is inserted into the mounting bracket 14, the mounting collar 38 slides over the ramped shelf 50 and occupies the segmented channel 46, seating the molded assembly 12 in the mounting bracket 14. The raised shelf 48 and the ramped shelf 50 limit axial movement of the molded assembly 12, while the radial flanges 42, 44 limit rotational movement of the molded assembly 12. In this regard, the molded assembly 12 is constrained axially and radially, but the molded assembly 12 is still able to oscillate to a limited extent to absorb and/or counteract vibrational energy from the engine.

In the embodiment of FIGS. 1-3, the elastomeric tabs 20, 22 are integrally formed with the elastomeric coating 18. In other embodiments, the elastomeric tabs are formed separately from the elastomeric coating 18. The elastomeric tabs 20, 22 are shaped to be received within corresponding slots 52 in the elastomeric coating 18 (with only one slot being visible in FIG. 3). Each slot 52 is recessed, such that a thin radial gap exists between each slot 52 and the mounting collar 38. The first and second elastomeric tabs 20, 22 are selectively positioned in this gap for increasing the natural frequency $f_n$ of the tunable mass damper 10.

In particular, the natural frequency $f_n$ (Hz) of the tunable mass damper 10 is determined according to the following equation (1), in which $k_d$ represents the dynamic stiffness (N/m) of the tunable mass damper 10, and m represents the mass (kg) of tunable mass damper 10:

$$f_n = \frac{1}{2\pi}\sqrt{k_d/_m} \tag{1}$$

For a given mass, the natural frequency of the tunable mass damper 10 can be varied by changing its dynamic stiffness ($k_d$). In the illustrated embodiment, the dynamic stiffness ($k_d$) of the tunable mass damper 10 is changed using the elastomeric tabs 20, 22.

More specifically, the elastomeric tabs 20, 22 are joined to the elastomeric coating 18 along a living hinge 54, such that each elastomeric tab 20, 22 can flex from a retracted position, shown in FIG. 3, to a seated position, shown in FIG. 1. In the retracted position, the elastomeric tabs 20, 22 extend radially outward from the elastomeric coating 18. If the tunable mass damper 10 has the desired natural frequency, the retracted elastomeric tabs 20, 22 can be removed (e.g., severed) from the elastomeric coating 18. If the natural frequency is below a target frequency (or below a target frequency range), one or more of the elastomeric tabs 20, 22 can be folded along its living hinge 54, flush with the outer surface of the elastomeric coating 18. Once press fit into the mounting collar 38, the one or more elastomeric tabs 20, 22 are radially compressed between the elastomeric coating 18 and the mounting collar 38, which increases the stiffness of the tunable mass damper 10. In addition, the elastomeric tabs 20, 22 increase the contact area between the elastomeric material and the mounting collar 38, which also increases the stiffness of the tunable mass damper 10.

The inner surface 56 of each tab 20, 22 is planar, such that each tab 20, 22 is flush with a corresponding planar slot 54 in the outer circumferential surface of the elastomeric coating 18. The outer surface of each tab 20, 22 is outwardly convex and has an arcuate notch having a depth for receiving the mounting collar 38 therein. While only two tabs are shown in the illustrated embodiment, greater or fewer tabs can be used in other embodiments. For example, other embodiments can include one, three, or four elastomeric tabs.

In operation, each molded assembly 12 is tested via a press test while held in a fixture to determine if the elastomeric coating 18 is softer or harder than specified. Because elastomers can have a Shore A durometer that varies by +/−5 durometer or more, a softer elastomer can result in a natural frequency that is too low, while a harder elastomer can result in a natural frequency that is too high. The stiffness of the elastomeric coating 18 is then used to determine whether the final assembly should include one or more of the elastomeric tabs 20, 22. If the stiffness of the elastomeric coating 18 is below a desired level, one or more of the elastomeric tabs 20, 22 are folded against the elastomeric coating 18. If the stiffness of the elastomeric coating is instead equal to or greater than a desired level, the elastomeric tabs 20, 22 are removed from the molded assembly 12. The molded assembly 12 is then pressed into the mounting bracket 14. The elastomeric coating 18 prevents direct contact between the damper mass 16 and the mounting bracket 14, and the elastomeric coating 18 functions as a spring element between the damper mass 16 and the mounting bracket 14. As a result, the natural frequency $f_n$ of the tunable mass damper 10 can be varied on an as-needed basis to ensure specific vibrations are appropriately attenuated.

Figure 4:
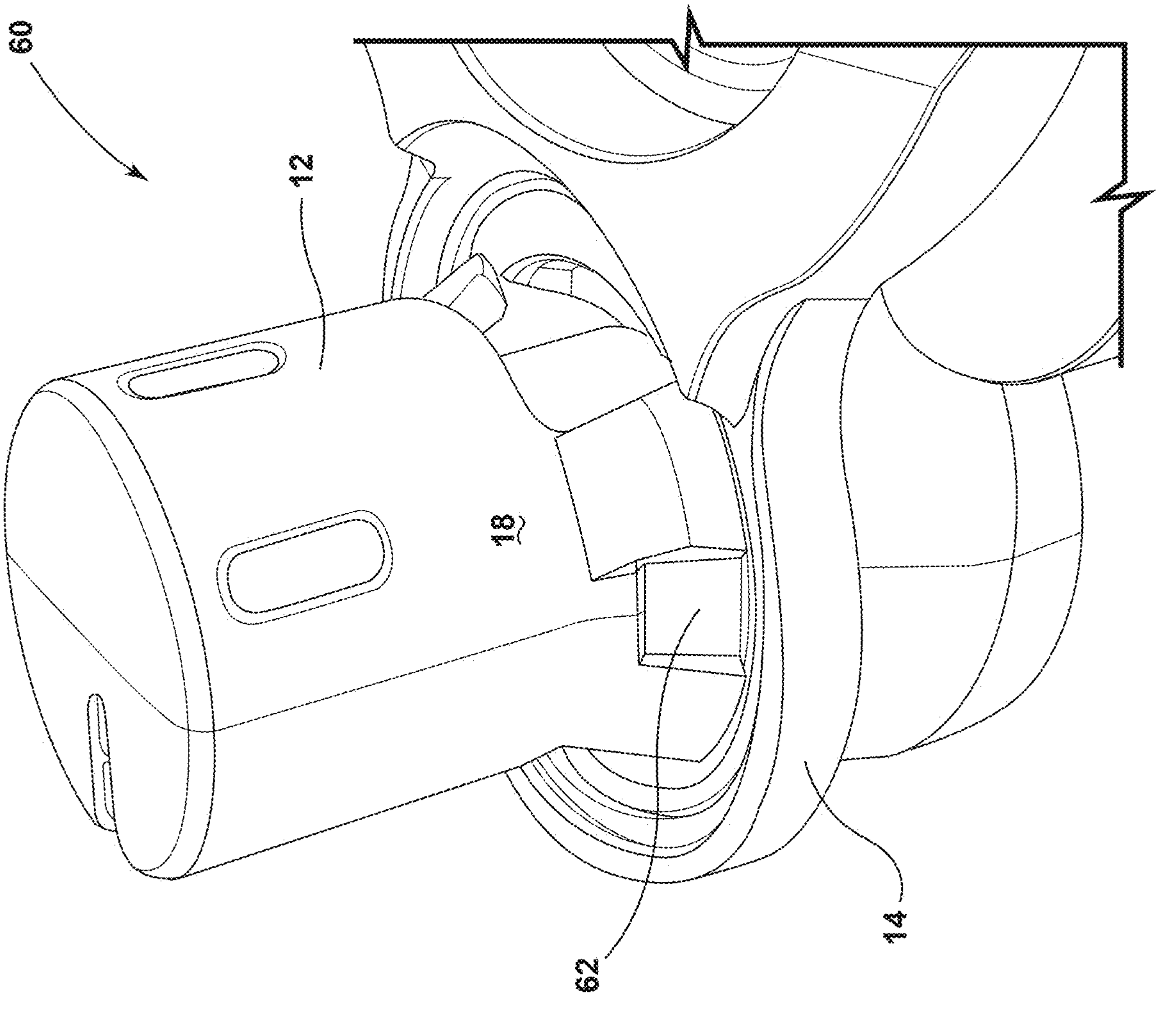
FIG. 4 is a perspective view of a tunable mass damper in accordance with another embodiment of the invention.
Figure 5:
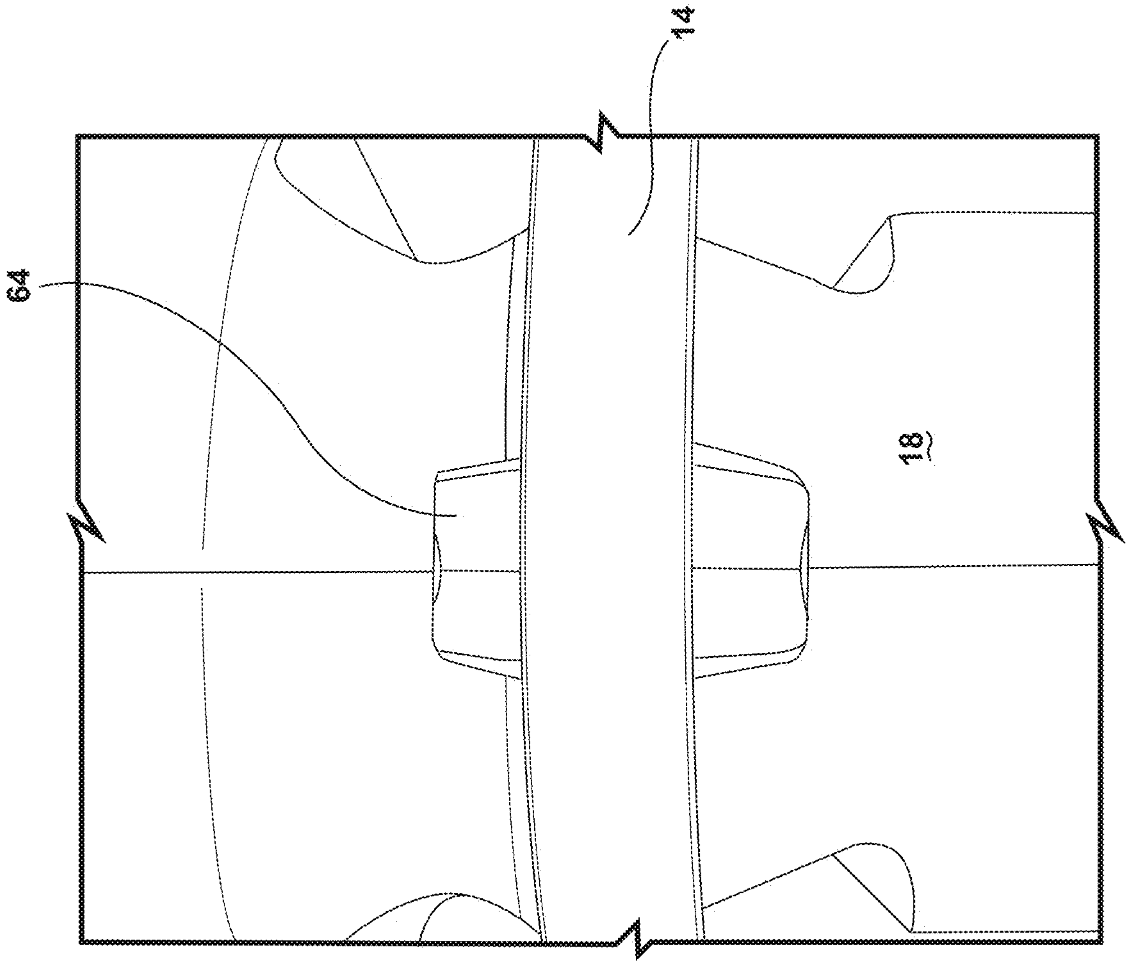
FIG. 5 is a close-up view of the tunable mass damper of FIG. 4 including elastomeric tabs for tuning the natural frequency of the mass damper.

Referring now to FIGS. 4-5, a tunable mass damper in accordance with a further embodiment is illustrated and generally designated 60. The tunable mass damper 60 is structurally and functionally similar to the tunable mass damper 10 of FIGS. 1-3, except that the elastomeric tabs are not integrally formed with the elastomeric coating. Instead as shown in FIG. 4, the tunable mass damper 60 includes a notch 62 in the molded assembly 12, with each such notch 62 defining a radial gap between the elastomeric coating 18 and the mounting bracket 14. The notch 62 is shaped to receive a corresponding elastomeric tab 64 (shown in FIG. 5) for increasing the dynamic stiffness of the tunable mass damper 60. Each elastomeric tab 64 is formed from the same or a different elastomeric material as the elastomeric coating 18 and is shaped to be compressed radially between the elastomeric coating 18 and the mounting bracket 14. If the dynamic stiffness of the tunable mass damper 60 is below a desired level, one or more of the elastomeric tabs 64 are inserted into a corresponding notch 62 in the outer radial surface of the elastomeric coating 18, and the molded assembly 12 is then pressed into the mounting bracket 14. As a result, the natural frequency $f_n$ of the tunable mass damper 60 can be varied on an as-needed basis to ensure specific vibrations are appropriately attenuated.

To reiterate, the present invention includes a molded assembly that is engineered to have a natural frequency just under a target frequency. One or more elastomeric tabs can be added to the molded assembly on an as-needed basis to incrementally increase the natural frequency of the molded assembly until the natural frequency is (approximately) equal to the target frequency. For example, laboratory testing demonstrated a 7% to 14% increase in natural frequency for each elastomeric tab added to the molded assembly. Once the elastomeric tabs are added to the molded assembly, a power press is used to press the molded assembly (and the elastomeric insert) into the mounting bracket. As a result, the mass damper is manually tuned during final assembly to attenuate vibrations at the target frequency or within a target frequency rang.

The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this invention.

The invention claimed is:

1. A tunable mass damper comprising:

a mounting bracket; and a molded assembly that is press-fit into the mounting bracket, the molded assembly including an elastomeric coating that is overmolded onto a damper mass, wherein the molded assembly further includes an elastomeric tab that is selectively inserted into a slot in the elastomeric coating to increase a natural frequency of the tunable mass damper.

2. The tunable mass damper of claim 1, wherein the elastomeric coating is overmolded onto the damper mass according to an injection molding process.

3. The tunable mass damper of claim 1, wherein the elastomeric tab is integrally joined to the elastomeric coating along a living hinge.

4. The tunable mass damper of claim 1, wherein the elastomeric tab is separate from the elastomeric coating.

5. The tunable mass damper of claim 1, wherein the elastomeric coating prevents direct contact between the damper mass and the mounting bracket.

6. The tunable mass damper of claim 1, wherein the elastomeric coating completely or partially encapsulates the damper mass.

7. The tunable mass damper of claim 1, wherein the elastomeric coating defines a segmented channel on opposing sides of the slot, the segmented channel being shaped to retain the mounting bracket therein, such that the mounting bracket radially compresses the elastomeric tab against the elastomeric coating when the molded assembly is press-fit into the mounting bracket.

8. The tunable mass damper of claim 1, wherein the elastomeric tab is a first elastomeric tab, the molded assembly including a second elastomeric tab opposite of the first elastomeric tab.

9. The tunable mass damper of claim 1, wherein the elastomeric coating comprises natural rubber, nitrile rubber, polyurethane, or silicone rubber.

10. The tunable mass damper of claim 1, wherein the molded assembly is keyed to the mounting bracket such that relative rotation of the molded assembly is prevented.

11. A tunable mass damper comprising:

a molded assembly including a damper mass that is at least partially encapsulated with an elastomeric coating; and a mounting bracket having a mounting collar extending around the molded assembly, such that the elastomeric coating is between the damper mass and the mounting collar;

wherein the molded assembly is adjustably tuned to have a desired natural frequency by selectively inserting an elastomeric tab into a recessed slot in the elastomeric coating.

12. The tunable mass damper of claim 11, wherein the mounting collar comprises an annular ring that extends around the molded assembly.

13. The tunable mass damper of claim 12, wherein the elastomeric tab is disposed between the elastomeric coating and the mounting collar.

14. The tunable mass damper of claim 11, wherein the elastomeric coating is retained within the recessed slot in the elastomeric coating by interference fit.

15. The tunable mass damper of claim 11, wherein the elastomeric tab is integrally joined to the elastomeric coating along a living hinge.

16. The tunable mass damper of claim 11, wherein the elastomeric tab is separate from the elastomeric coating.

17. A molded assembly for a tunable mass damper, the molded assembly comprising:

a damper mass;

an elastomeric coating; and an elastomeric tab that is configured to be received within a slot in an exterior surface of the elastomeric coating for achieving a desired natural frequency of the molded assembly.

18. The molded assembly of claim 17, wherein the elastomeric tab is co-molded with the elastomeric coating, such that the elastomeric tab is integrally joined to the elastomeric coating.

19. The molded assembly of claim 17, wherein the elastomeric tab is a first elastomeric tab, further including a second elastomeric tab that is radially offset from the first elastomeric tab.

20. The molded assembly of claim 17, wherein the elastomeric tab is molded separately from the elastomeric coating and comprises natural rubber, nitrile rubber, polyurethane, or silicone rubber.

* * * * *